May 16, 1950  J. S. MACDONALD  2,507,640
GEAR SYSTEM
Filed May 4, 1948  4 Sheets-Sheet 1

INVENTOR:
JAMES S. MACDONALD
BY Francis E. Boyce
ATTORNEY

May 16, 1950     J. S. MACDONALD     2,507,640
GEAR SYSTEM

Filed May 4, 1948     4 Sheets-Sheet 2

INVENTOR:
JAMES S. MACDONALD
BY Francis E. Boyce
ATTORNEY

May 16, 1950 J. S. MACDONALD 2,507,640
GEAR SYSTEM

Filed May 4, 1948 4 Sheets-Sheet 3

INVENTOR:
JAMES S. MAC DONALD
BY Francis E. Boyce
ATTORNEY

May 16, 1950 J. S. MACDONALD 2,507,640
GEAR SYSTEM
Filed May 4, 1948 4 Sheets-Sheet 4
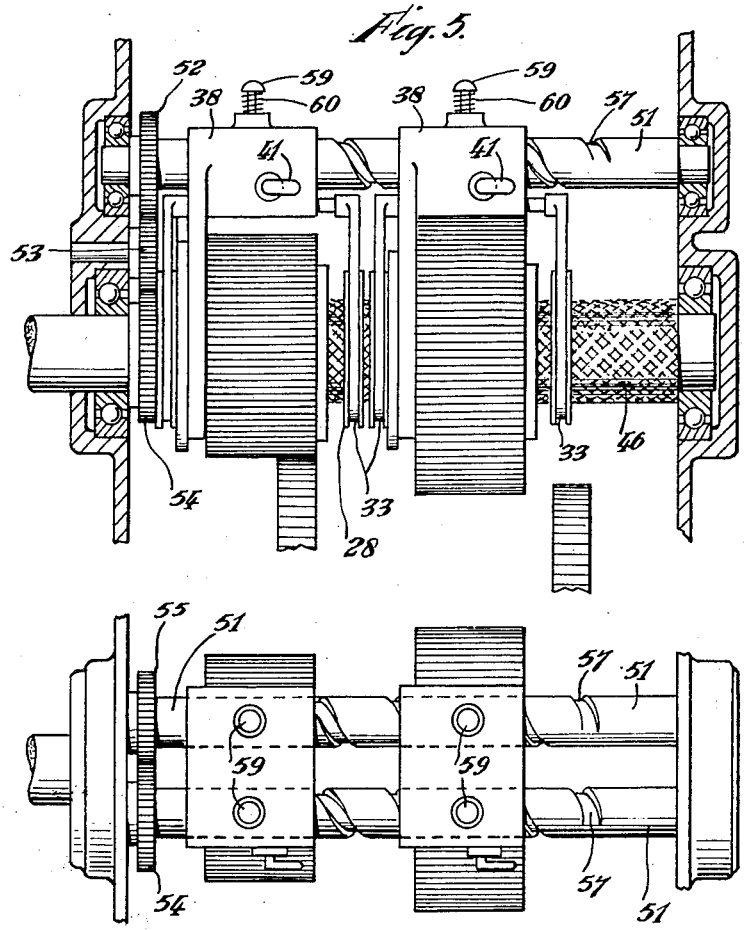

Patented May 16, 1950

2,507,640

UNITED STATES PATENT OFFICE 2,507,640

GEAR SYSTEM

James Stewart Macdonald, Kenton, England

Application May 4, 1948, Serial No. 25,042
In Great Britain May 16, 1947

9 Claims. (Cl. 74—339)

This invention relates to gear systems and in particular to methods of changing gears.

It is an object of the present invention to provide a gear system in which a change of gear may be effected by a progressive change of ratio and without interruption of the drive.

According to the present invention I provide a gear system characterised by a shaft, two or more fixed gear wheels of different diameter keyed thereto, a second shaft, two or more pairs of sets of spiral peripheral grooves formed on said second shaft, the sets of grooves in each pair being of opposite sense, two or more slideable gear wheels, adapted to mesh respectively with the gear wheels on said first shaft; said slideable gear wheels being freely rotatable about said second shaft, each of said slideable gear wheels being associated with a device adapted to engage with the peripheral grooves. Said slideable gears may be connected for longitudinal motion. Selector means may be provided adapted to engage said devices associated with said slideable gears with the set of peripheral grooves of the desired sense. Selector means may be provided to move said gears longitudinally along the shaft at a speed proportionate to the speed of the shaft.

The invention will now be explained with reference to the accompanying drawings wherein—

Fig. 5 shows a side view of the driving shaft and slideable gears complete with selector driving means.

Fig. 6 shows a top view of the driving shaft and selector driving means.

Figure 1:
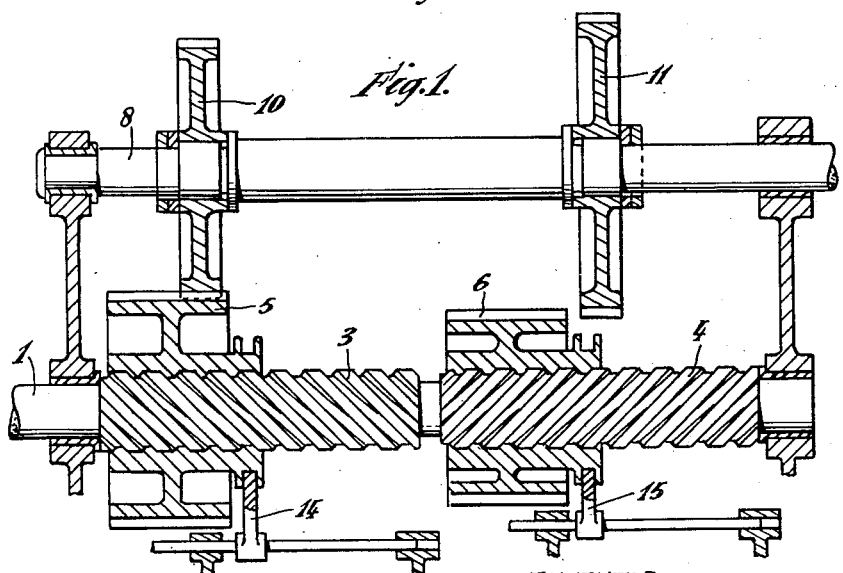
Fig. 1 is a diagram to show the principle on which the present invention is based and is not a practical example.

Fig. 1 shows the basic principle underlying the present invention. The system shown therein comprises the driving shaft 1, formed with two sets of helical splines 3 and 4 of opposite inclination. Mounted on said shaft are the slideable gears 5 and 6 which engage with the splines 3 and 4 respectively and are moveable longitudinally in respect to said shaft. On the driven shaft 8 are mounted the fixed gears 10 and 11 which are engageable with slideable gears 5 and 6 respectively.

The gears 5 and 6 are moveable longitudinally by means of the selectors 14 and 15 which act at the same time.

In operation to disengage gears 5 and 10 and engage gears 6 and 11 the selectors would be caused to move the gears 5 and 6 from left to right. First the gear 6 is accelerated along the shaft. Owing to the action of the peripheral grooves it will be proportionately accelerated in a rotational sense with respect to the shaft. The amount of this acceleration is so arranged in the design that when the gear comes into initial contact with its mating gear 11 their peripheral velocities are the same and their teeth in correct relation for meshing. After meshing has thus been effected the gear 6 would be decelerated whilst at the same time longitudinal movement of the gear 5 would commence at increasing velocity. This process would continue until gear 6 is brought to rest (relatively to the shaft) just as gear 5 comes out of mesh. The change is now complete and the drive continues at the new ratio.

It is clearly apparent that the helical splines shown in Fig. 1 can only be utilised for engaging the gears 6 and 11 and cannot be used for the reverse change, for which the gears must be engaged with splines of opposite inclination.

Each of the slideable gears must therefore be provided with means by which it can be engaged at will with helical splines or other form of peripheral grooves of opposite inclination at will.

Accordingly each slideable gear is made freely rotatable on its shaft and is provided with two groove selectors, each of which is engaged with oppositely inclined splines. Means are provided for engaging the gear with the groove selectors alternately.

Figure 2:
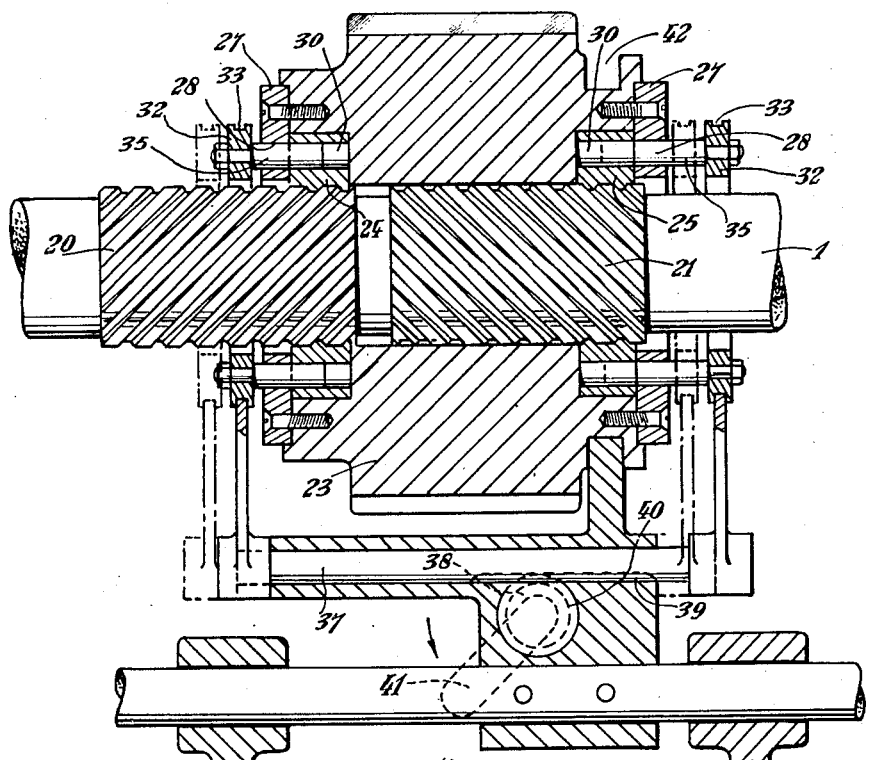
Fig. 2 shows a detail of one of the slideable gears and its associated parts.

Fig. 2 shows a detail of one such arrangement, wherein the driving shaft 1 is provided with a pair of oppositely inclined splines 20 and 21 within the range of travel of the slideable gear 23. The slideable gear 1 is freely rotatable about the shaft 1 and is rotatably mounted on the splined collars 24 and 25 which engage with the splines 20 and 21 respectively. The collars are retained within the gear by the end plates 27 which are attached to the gear. The end plates 27 are provided with apertures 28 which are superposable over apertures 30 formed in the splined collars 24 and 25.

The spline selectors 31 and 32 which are interconnected for movement as hereinafter described engage a peripheral groove on cages 34, which are thus free to rotate with respect to said selectors. Pins 35 carried on the cages 34 are moveable longitudinally in the apertures 28 so that either the collar 24 or collar 25 may be connected for rotation to the gear 23 through the pins 35 and the appropriate end plate 27.

The spline selectors 31 and 32 are connected by the longitudinal bar 37 which is mounted within the gear selector 38.

The bar 37 is formed with a rack 39 and is longitudinally moveable by means of a toothed segment 40 attached to a pivoted lever 41.

The gear selector engages with the grooves 42 formed on the slideable gear 23.

Figure 3:
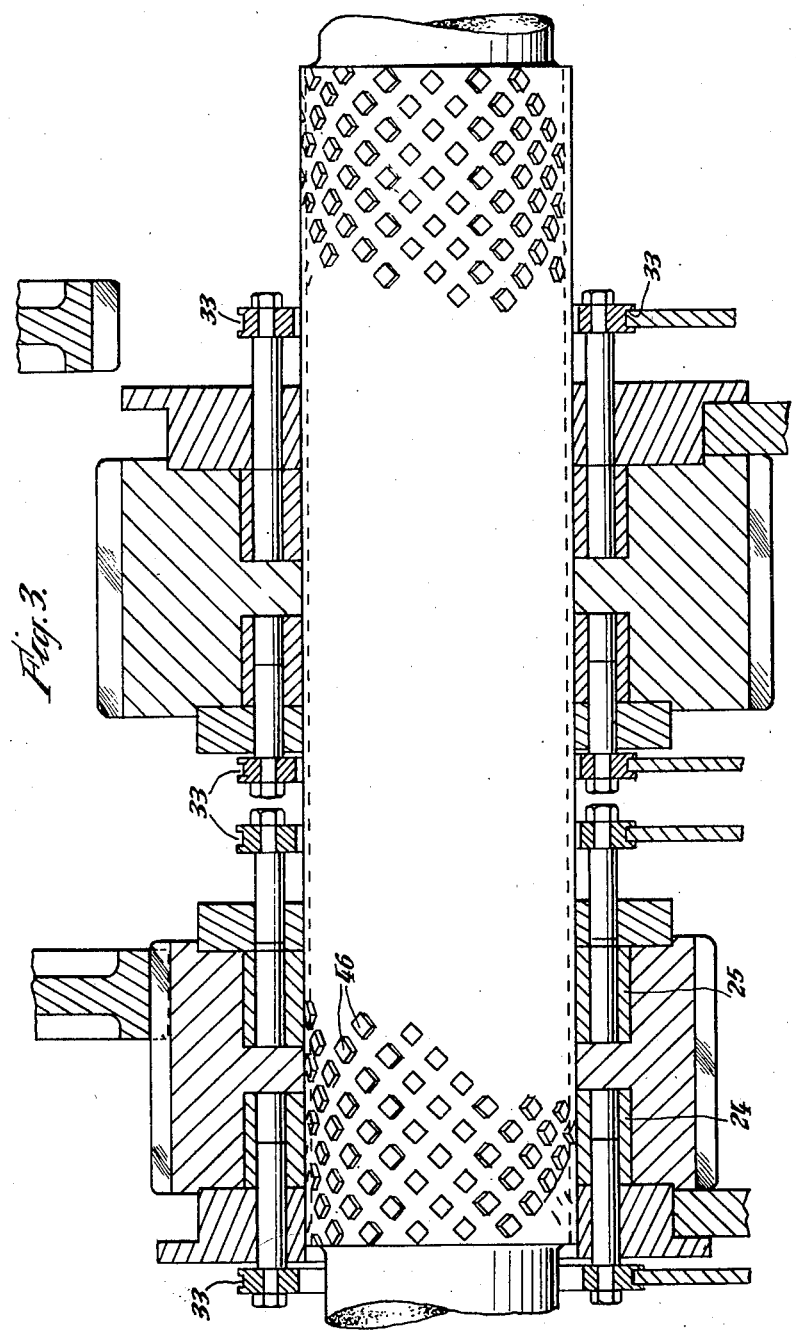
Fig. 3 shows a modification of the method of splining the driving shaft.

Fig. 3 shows a modified method of forming helical splines on the driving shaft 1, the remaining parts being the same as in Fig. 2 and shown diagrammatically only.

In order to shorten the overall length of the driving shaft and in order that machining of the splines may be done in long continuous lengths, the shaft 1 is formed over its whole length with two sets of superimposed splines of equal pitch and opposite inclination, so that instead of being formed with two sets of continuous splines, the shaft is machined down so that only raised projections 46 are left remaining.

This enables both the left hand collar 24 and right hand collar 25 to be moved over the whole length of the shaft if so desired.

To ensure correct meshing of the gears when using helical splines it is necessary that the longitudinal speeds of the slideable gears should be at a speed proportional to the speed of rotation of the shaft, so that the right amount of acceleration or deceleration for correct meshing will be imposed on the respective sliding gears.

Figure 4:
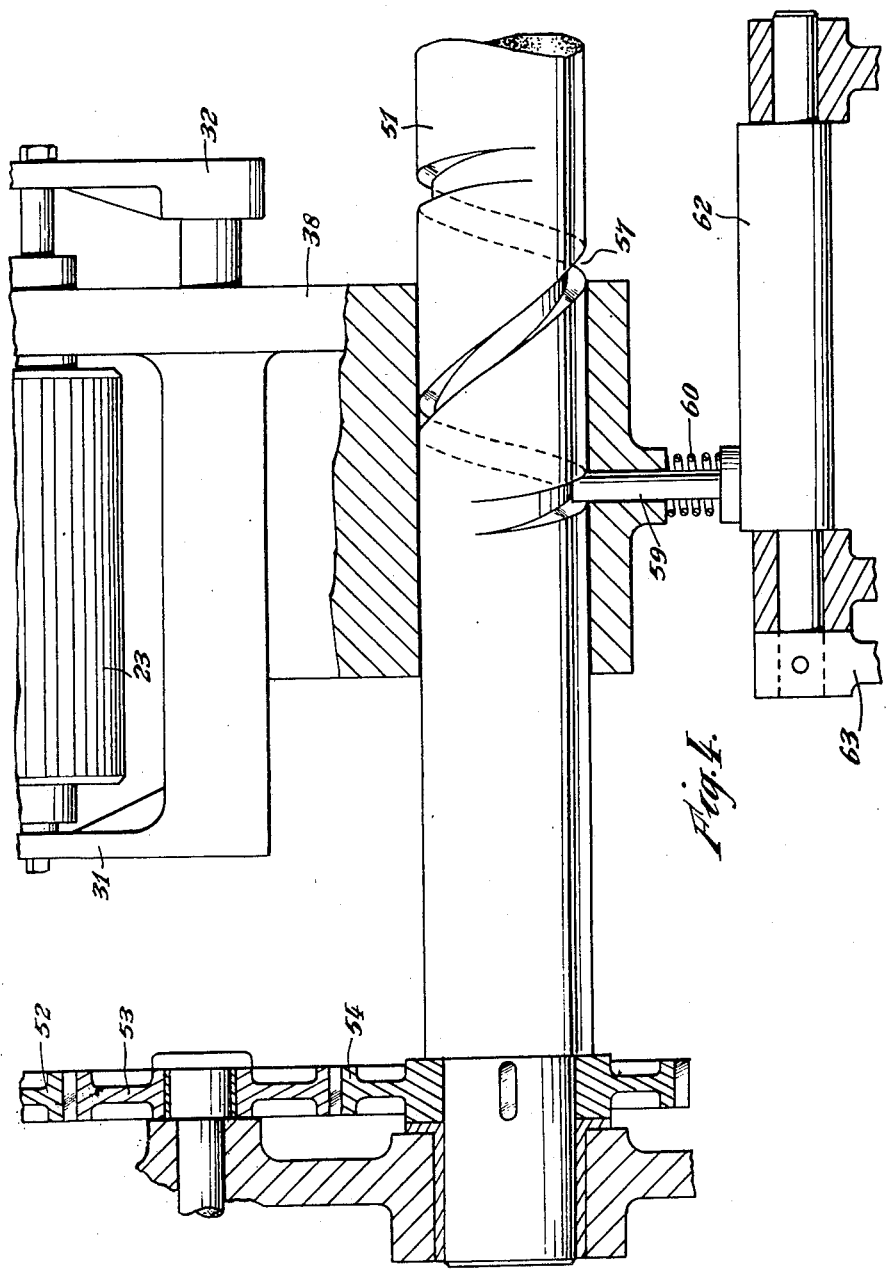
Fig. 4 shows a detail of the selector driving means.

The longitudinal movement of the gears may be effected by a device such as that shown in Fig. 4 wherein the slideable gear 23 is provided with spline selectors 31 and 32 (shown diagrammatically) and a gear selector 38 as in Fig. 2. The gear selector 38 is mounted on parallel auxiliary shafts 51 (only one of which is visible in Fig. 4) which is driven from the driving shaft 1, to which a gear 52 is affixed through an idle gear 53 to the gear 54 attached to the shaft 51. The other shaft 51 is rotated in the counter direction by a gear 55 attached thereto driven from the gear 54.

The shafts 51 are formed with a cam groove 57 of varying pitch, the pitch increasing from zero to a maximum for the acceleration of the gear and then decreasing again to zero for its deceleration.

The cam groove 57 is adapted to be engaged by a cam follower 59 mounted in the gear selector 38, which is normally kept out of engagement with the cam groove by the compression spring 60.

The cam follower 59 engaged with the cam groove 57 by means of a cam bar 62 which is rotated by the gear lever 63.

It is obvious that both the shafts 51 will be provided with a corresponding gear lever and cam bar for the reverse gear change.

Figs. 5 and 6 show a complete gear box designed on the lines disclosed with the gear change levers omitted and in Fig. 6 with the spline selectors omitted.

The foregoing description is not intended to be limiting and any of the devices may be replaced by some mechanical equivalent.

The splines need not be helical and it may be preferable to replace them by splines of more complex shape, in which case the spline collars would have to be modified, the modification being that instead of being internally splined they would be provided with evenly disposed inwardly projecting circular radial pins, which would not jam in the peripheral grooves.

It will also be apparent that the slideable gears could be mounted on the driven shaft instead of the driving shaft without in any way departing from the principle of the invention.

What I claim and desire to secure by Letters Patent is:

1. In a gear system in combination a shaft, at least two fixed gears of different diameters keyed thereto, a second shaft, two sets of helical splines formed on said second shaft, the helical splines being of opposite sense and superimposed one on the other, at least two slideable gears adapted to mesh with said fixed gears respectively mounted on said second shaft, spline selector means associated with each of said slideable gears to engage said slideable gears with one of said sets of helical splines, and means for moving said slideable gears longitudinally along said second shaft.

2. In a gear system in combination a shaft, at least two fixed gears of different diameters keyed thereto, a second shaft, two sets of helical splines formed on said second shaft, the helical splines being of opposite sense and superimposed one on the other, at least two slideable gears adapted to mesh with said fixed gears respectively mounted on said second shaft, spline selector means associated with each of said slideable gears to engage said slideable gears with one of said sets of helical splines, and means for moving said slideable gears longitudinally along said second shaft at a speed proportionate to the speed of rotation of said shaft.

3. In a gear system in combination, a shaft, at least two fixed gears of different diameters fixed thereto, a second shaft, two pairs of sets of helical splines formed on said second shaft, each pair comprising sets of splines of opposite inclination, two pairs of internally splined collars mounted on said second shaft, each of said collars engaging with one of said sets of splines, a freely rotatable gear mounted on each of said pairs of collars, said freely rotatable gears being adapted to engage with a corresponding fixed gear, means for connecting said freely rotatable gear alternately with one of the splined collars and means for moving said freely rotatable gears and splined collars longitudinally along said second shaft.

4. In a gear system in combination, a shaft, at least two fixed gears of different diameters fixed thereto, a second shaft, two pairs of sets of helical splines formed on said second shaft, each pair comprising sets of splines of opposite inclination, two pairs of internally splined collars mounted on said second shaft, each of said collars engaging with one of said sets of splines, a freely rotatable gear mounted on each of said pairs of collars, said freely rotatable gears being adapted to engage with a corresponding fixed gear, means for connecting said freely rotatable gear alternately with one of the splined collars and means for moving said freely rotatable gears and splined collars longitudinally along said second shaft at a speed proportionate to the speed of rotation of said shaft.

5. In a gear system in combination a shaft, at least two fixed gear wheels of different diameters keyed thereto, a second shaft, two sets of peripheral grooves of opposite inclination formed on said second shaft, at least two slideable gears adapted to engage with said fixed gears respectively mounted on said second shaft, means for connecting each of said slideable gears alternately with one of said sets of grooves and means for moving said slideable gears longitudinally along said second shaft whereby the speed of rotation of said second shaft is altered relative to the speed of rotation of said first shaft.

6. In a gear system in combination a shaft, at least two fixed gear wheels of different diameters keyed thereto, a second shaft, at least two slideable gears, adapted to engage with said fixed gears respectively, mounted thereon, two sets of peripheral grooves of opposite inclination formed on said second shaft, means for engaging each of said slideable gears alternately with one of said sets of grooves, and means for moving said slideable gears longitudinally along said second shaft at a speed proportionate to the speed of rotation of said shaft.

7. In a gear system in combination a shaft, at least two fixed gear wheels of different diameters keyed thereto, a second shaft, at least two slideable gears, adapted to be engaged with said fixed gears respectively, mounted thereon, two sets of peripheral grooves of opposite inclination formed on said second shaft means for engaging each of said slideable gears alternately with one of said sets of grooves, a pair of auxiliary shafts, cam grooves formed in said auxiliary shafts, means for driving said auxiliary shafts at a speed proportionate to the speed of said second shaft, selector means mounted on said auxiliary shafts for moving said slideable gears longitudinally on said second shaft and means for engaging said selector means with said cam grooves alternately to move said slideable gears longitudinally along said second shaft.

8. In a gear system in combination a shaft, at least two fixed gears of different diameters keyed thereto, a second shaft, two sets of helical splines formed on said second shaft, the helical splines being of opposite sense and superimposed one on the other, at least two slideable gears, adapted to mesh with said fixed gears respectively, mounted on said second shaft, spline selector means associated with each of said slideable gears to engage with slideable gears with one of said sets of helical splines, a pair of auxiliary shafts, cam grooves formed in said auxiliary shafts, means for driving said auxiliary shafts at a speed proportionate to the speed of said second shaft, selector means mounted on said auxiliary shafts for moving said slideable gears longitudinally on said second shaft and means for engaging said selector means with said cam grooves alternately to move said slideable gears longitudinally along said second shaft, whereby the speed of rotation of said second shaft is altered relative to the speed of rotation of said first shaft.

9. In a gear system in combination, a shaft, at least two fixed gears of different diameters fixed thereto, a second shaft, two pairs of sets of helical splines formed on said second shaft, each pair comprising sets of splines of opposite inclination, at least two pairs of internally splined collars mounted on said second shaft, each of said collars engaging with a corresponding set of splines, at least two freely rotatable gears each mounted on a corresponding pair of collars, said freely rotatable gears being in constant mesh with a corresponding fixed gear, means of engaging each of said freely rotatable gears alternately with one of the splined collars on which it is mounted, a pair of auxiliary shafts, cam grooves formed in said auxiliary shafts, means for driving said auxiliary shafts at a speed proportionate to the speed of said second shaft, selector means mounted on said auxiliary shafts, for moving said slideable gears longitudinally on said second shaft, means for engaging said selector means with said cam grooves alternately to move said slideable gears longitudinally along said second shaft.

JAMES STEWART MACDONALD.

REFERENCES CITED

The following references are of record in the file of this patent:

UNITED STATES PATENTS

| Number | Name | Date |
|---|---|---|
| 2,075,798 | Brown | Apr. 6, 1937 |
| 2,248,133 | Snow | July 8, 1941 |
| 2,304,863 | Thompson | Dec. 15, 1942 |
| 2,320,757 | Sinclair | June 1, 1943 |
| 2,379,164 | Larsen | June 26, 1945 |

FOREIGN PATENTS

| Number | Country | Date |
|---|---|---|
| 355,482 | Great Britain | Aug. 27, 1931 |
| 231,746 | Switzerland | July 1, 1944 |